United States Patent
Keppens et al.

(10) Patent No.: US 9,320,264 B2
(45) Date of Patent: Apr. 26, 2016

(54) BUMBLEBEE NEST BOX

(75) Inventors: Willem Steven Paul Keppens, Westerlo (BE); Tim Bollens, Westerlo (BE); Felix Leopold Wackers, Westerlo (BE); Hidetoshi Yokoi, Mie (JP); Masahiro Yoneda, Mie (JP); Takayuki Aoki, Mie (JP)

(73) Assignees: Biobest Belgium NV, Westerlo (BE); Tokai Trading Co. Ltd., Yokkaichi, Mie (JP)

( * ) Notice: Subject to any disclaimer, the term of this patent is extended or adjusted under 35 U.S.C. 154(b) by 903 days.

(21) Appl. No.: 13/574,341

(22) PCT Filed: Jan. 24, 2011

(86) PCT No.: PCT/EP2011/050905
§ 371 (c)(1),
(2), (4) Date: Jul. 20, 2012

(87) PCT Pub. No.: WO2011/089248
PCT Pub. Date: Jul. 28, 2011

(65) Prior Publication Data
US 2012/0295514 A1    Nov. 22, 2012

(30) Foreign Application Priority Data

Jan. 22, 2010 (JP) .................................. 2010-11700
Jul. 19, 2010 (GB) .................................. 1012056.6

(51) Int. Cl.
*A01K 47/06*    (2006.01)
(52) U.S. Cl.
CPC ........................................ *A01K 47/06* (2013.01)
(58) Field of Classification Search
CPC .......................................................... A01K 47/06
USPC .................................. 449/13, 14, 15, 26, 27
See application file for complete search history.

(56) References Cited

U.S. PATENT DOCUMENTS

| | | | | |
|---|---|---|---|---|
| 207,731 A | * | 9/1878 | Gale | A01K 47/06 449/13 |
| 1,435,118 A | * | 11/1922 | Heim et al. | A01K 53/00 449/10 |
| 1,468,995 A | * | 9/1923 | Cottam | A01K 47/06 449/13 |
| 1,491,213 A | * | 4/1924 | Troilo | 449/15 |
| 2,403,840 A | | 7/1946 | Ashurst | |
| 3,927,431 A | | 12/1975 | Wallace | |
| 4,524,476 A | * | 6/1985 | Adams, IV | 449/27 |
| 5,509,846 A | | 4/1996 | Kueneman et al. | |
| 5,575,703 A | * | 11/1996 | Stearns | A01K 47/06 449/13 |
| 7,686,672 B2 | * | 3/2010 | Katsampis | A01K 53/00 449/15 |
| 2006/0148379 A1 | | 7/2006 | Lappas | |

FOREIGN PATENT DOCUMENTS

| | | |
|---|---|---|
| AU | 2008201117 A1 | 10/2008 |
| FR | 1583138 | 10/1969 |
| GB | 869884 | 6/1961 |
| WO | 0057694 A1 | 10/2000 |
| WO | 2009135990 A1 | 11/2009 |

* cited by examiner

*Primary Examiner* — Lisa Tsang
(74) *Attorney, Agent, or Firm* — Dinsmore & Shohl LLP

(57) ABSTRACT

A nest box (1) for bumblebees that provides sufficient ventilation inside the nest box (1). The provided nest box (1) with a bumblebees hive (2) inside resolves the problems of insufficient ventilation, by being mounted with a ventilation panel (14), comprising ventilation holes (13) in size(s) that enable ventilation but at the same time bumblebees from passing through.

15 Claims, 11 Drawing Sheets

BUMBLEBEE NEST BOX

FIELD OF THE INVENTION

This invention relates to a nest box for bumblebees that provides sufficient ventilation inside the nest box. The provided nest box with a bumblebees hive inside resolves the problems of insufficient ventilation, by comprising on top of the nest box a ventilation panel, comprising ventilation holes in size(s) that enable ventilation but at the same time prevent bumblebees from passing through.

BACKGROUND TO THE INVENTION

Honeybees, bumblebees or mason bees are known in general as pollinators to be used for pollinating commercial crops such as fruits and vegetables. An effective breeding technique has been developed for bumblebees, which are used for pollinating solanaceous plants including tomatoes (JP2008-113605).

Bumblebees for pollination, sold in the market, are being contained in a nest box, typically made of cardboard, comprising an inner box preferably made of plastic, with their hive inside. (For example, the Tokai Bussan product from Hanyton, which is a bumblebee box for pollination.) Using bumblebees for pollination requires supplying them with appropriate nutrients from outside the hive in order to facilitate their efficient pollination for a certain period. Appropriate ventilation in the nest box is important as high humidity inside the hive may deteriorate breeding conditions for the bumblebees by causing protein decomposition in the nest box or getting the hive infested with ticks and consequently hamper pollination efficiency.

Also temperatures above 34° C. can adversely affect development of the bees and normal functioning thereof. Although they are still able to fly at temperatures up to 35° C., but they prefer to stay at the nest to ventilate the brood. Above 32° C., bumblebee workers not only stop foraging and start ventilating the brood, but they also stop feeding the larvae. Bumblebee larvae can starve for a considerable length of time (up to 2-3 days) before they die; however, a period of starvation results in a more prolonged developmental time. At around 40° C. bees prevent their own bodies from overheating by becoming inactive, and they stop fanning. As long as they are ventilating the nest, they are able to keep the brood temperature equal to, or just above) (1-2°, ambient temperature, but at temperatures over 40° C. they are not able to cool the brood below ambient temperature. Although there is no clear agreement on the temperature threshold limit, it has been indicated that an ambient temperature of 40° C. is about the maximum temperature at which bumble bee colonies can survive, on condition that a sufficient energy supply is available, but for the reasons given hereinbefore, at these elevated temperatures normal functioning of the bees and hive development is adversely affected. This makes commercial use of bumblebees problematic for greenhouse production of vegetables such as tomato, eggplant and pepper in warm climates unless an enabling technology is developed.

The existing ventilation hole(s) found on the lower part and upper part of a nest box such as the Standard hive, which is commercially available from Biobest Belgium N.V. and as shown in FIG. 2, did not serve the purpose sufficiently on its/their own and improvement was sought.

In an earlier effort to provide a nest box with adaptable ventilation behaviour, Man Yanai et al. (PCT Publication WO 00/57694) installed electrically operated ventilation mechanism at a face of the nest box. Where this solution provides satisfactory results, and in particular when installed at the top face of the nest box, it significantly enhances the costs for an economic and disposable nest box. The electrically ventilation mechanism further requires maintenance and at breakdown requires immediate attention of the grower.

This invention has been developed in response to the above situation and aims to deliver economic and disposable nest box for bumblebees, etc. that provides sufficient and adaptable ventilation inside the nest box, in response to the environmental conditions of temperature and humidity. After careful consideration, the inventor discovered that sufficient ventilation can be achieved in the nest box by making a ventilation hole(s) on component panel(s), i.e. by introducing a deployable ventilation panel in the area above the inner box comprising the hive, which basically completes the present invention.

As will be apparent from the examples hereinafter, the ventilation of the nest box of the present invention can easily be adapted by means of a deployable (installable) ventilation panel that in open position extends the nest box above the inner box comprising the hive. In particular when present as a deployable and integrated member of the nest box, it allows an easy adaptation of the ventilation conditions within the hive in response to the environmental conditions of temperature and humidity. Different from the artificially ventilated hive above, the nest box of the present invention requires no further attention

SUMMARY OF THE INVENTION

In a first aspect the present invention is directed to a nest box (1) for bumblebees, comprising an inner box (3) with their hive (2) inside which is characterized in that it comprises a ventilation panel in the area above the inner box (3) comprising the hive (2), said ventilation panel having one or more ventilation hole(s) in size(s) that enables ventilation but at the same time prevent bumblebees from passing through, and consists of the component panels covering the area above the inner box (3) comprising the hive (2), including the roof (lid) panel and the side panels.

As such, and compared to a traditional nest box, such as for example described in U.S. Pat. No. 5,509,846 and PCT Patent Publication WO2009/135990, the ventilation panel extends the nest box above the inner box (3) comprising the hive (2), and provides further ventilation means (13) compared to the ventilation hole(s) (11, 7A) present within and at the level of the inner box.

In one embodiment, the ventilation panel consists of the side panels covering the area above the inner box (3) comprising the hive (2). In the nest box of the present invention, ventilation through the box is achieved by a natural ventilation, wherein fresh air enters through the lower openings (7A), and warm air exhaled by the bees rises and leaves the nest box through the ventilation holes (11) and the ventilation hole(s) (13) present within the ventilation panel. Consequently, and different from WO 00/57694 above, the nest box according to the present invention is further characterized in that it does not comprise artificial, such as an electrically operated fan, ventilation means to ventilate the hive at high temperatures and/or high environmental humidity.

In a particular embodiment, said ventilation hole(s) have been made only on the side panel(s) of the ventilation panel in the area above the inner box (3) comprising the hive (2). In order to minimize the influence of the ventilation panel on the foraging behavior of the bees, and not to disorientate bees entering the hive, preferably no ventilation hole(s) are made on the face (14B) of the ventilation panel that corresponds with the face of the nest box where the entrance (4) of the inner box is fitted.

Given the known sensitivity of bumblebees to light and how it affects foraging activity, in a particular embodiment of the present invention, the lid does not comprise ventilation hole(s), and is not part of the ventilation panel that extends the nest box above the inner box (3) comprising the hive (2). In said embodiment the roof (lid) panel of said nest box has been arranged so it may be displaced independently of the ventilation panel, i.e. the lid is either detachable from the nest box, or attached in a hinged manner to the remaining of the nest box.

As such the present invention differs from the ventilation hood described in GB 869,884, which requires cooperation between the roof (lid) and the cover (side panels) to realize the chimney effect for the disposal of the warm air from the hive. (see GB 869,884 page 1—Right Column—Lines 82-86).

In a further embodiment, the side panels of the ventilation panel consist of a rectangular-shaped central panel (14A) with two side panels (14B, 14C) on both sides. Said side panels are either tapered, triangle-shaped end panels, or rectangular shaped side panels, optionally comprising recesses and/or cutouts to fit said side panels on both side ends of the nest box, alternatively the ventilation panel consists of a frame that fits on the side panels of the nest box, and accordingly consists four rectangular-shaped panels. In a preferred embodiment, and when installed (deployed) upon the nest box, the two side panels (14B, 14C) on both sides of the rectangular-shaped central panel have a tapered, triangle-shaped form.

The ventilation panel as used herein is either an independent, detachable member on top of the nest box, or an integrated, non-detachable member on top of the nest box, more in particular a deployable, integrated, non-detachable member that in open position extends the nest box above the inner box comprising the hive. In said latter embodiment the ventilation panel, and in particular the end/side panels (14B, 14C), further comprise one or more pliable folds (19) to enable that the ventilation panel can be folded inside, for example to reduce the volume of the nest box during transport or in case the ambient temperature and/or humidity are lower and enhanced ventilation of the nest box is not desired.

DESCRIPTION OF THE INVENTION

As used herein, "Bumblebees" means the bees that are bred in order to pollinate commercial crops, primarily, including Japanese native and western species.

Figure 1:
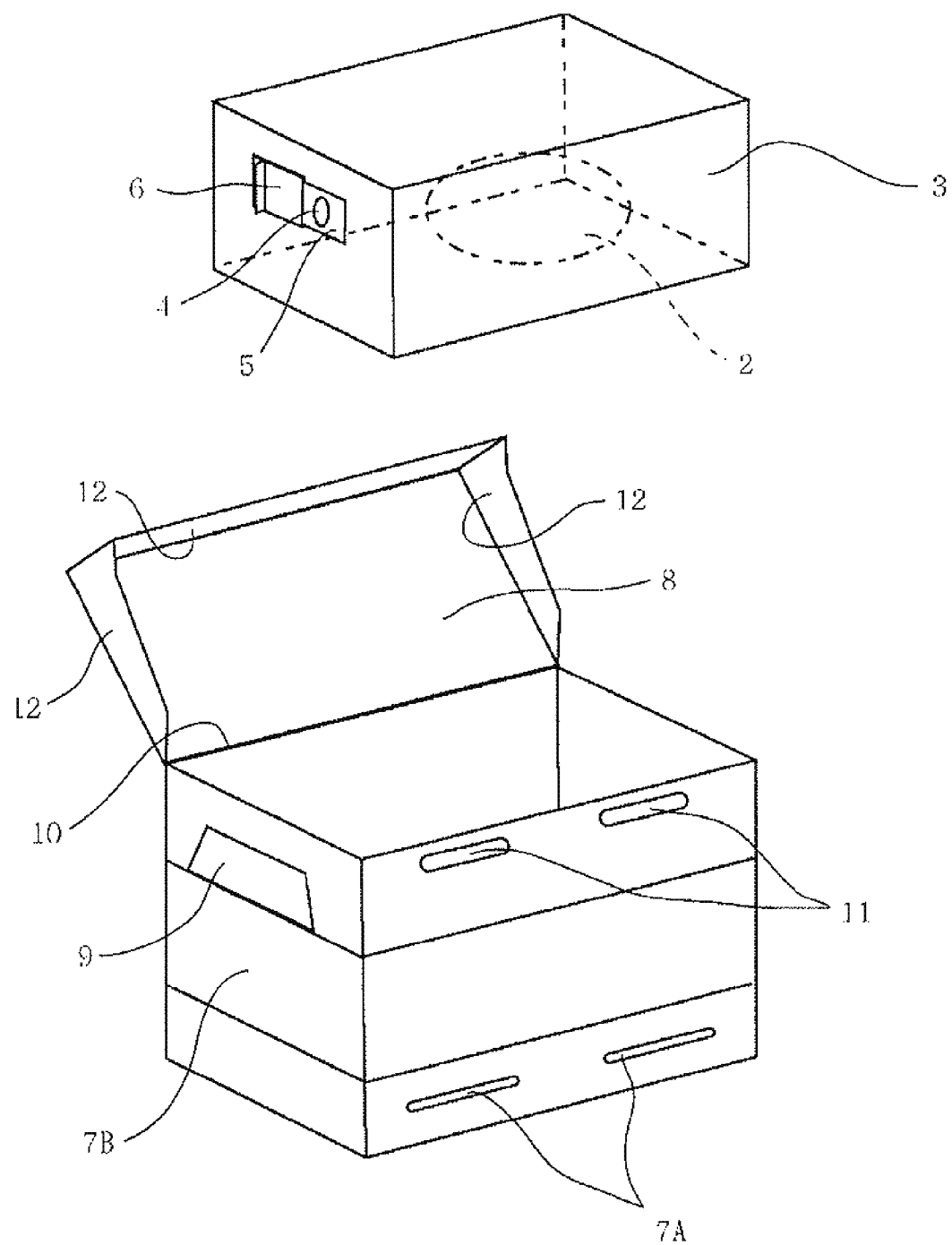
FIG. 1. A perspective view of the composition of this invention showing a standard nest box and the hive separately.
Figure 4:
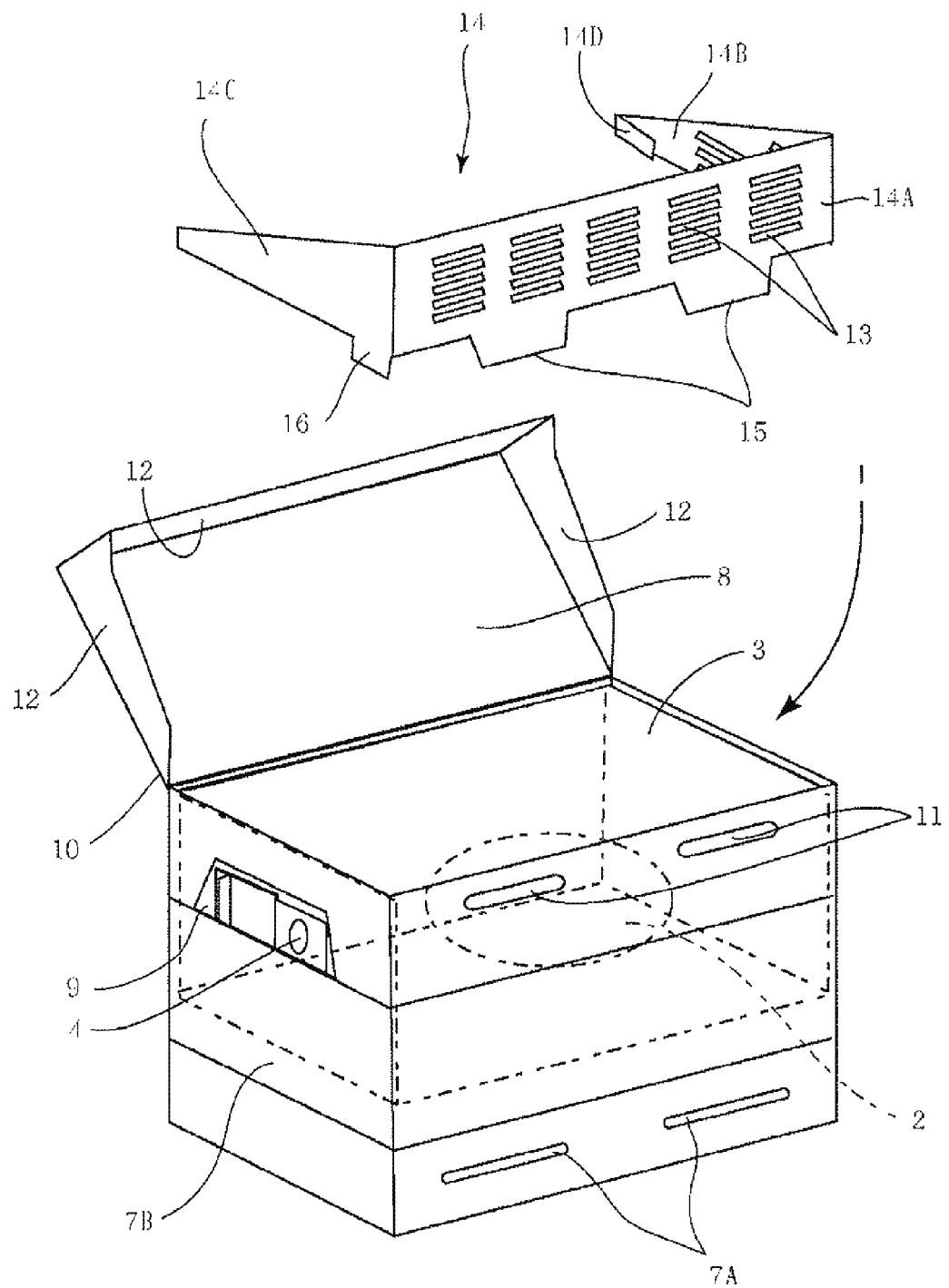
FIG. 4. A perspective view showing a possible way of fitting the ventilation panel to the nest box, according to the invention.

"A nest box" means the outer box (1), with an inner box (3) comprising the hive (2) inside, designed to facilitate breeding of social insects, such as bumblebees. After being transported to a place with flowers to pollinate, the bumblebees are freed from the nest box and are allowed to go and collect pollen or nectar, in order to store said pollen or nectar in the hive inside the inner box of the nest box. The nest box according to the invention may be made in any suitable shape and material, but given the objective of the present invention to provide an economic and disposable nest box (1) for bumblebees, is preferably made of a disposable material such as cardboard. The inner box (3), is preferably made of plastic, such as, but not limited to, polyvinylchloride (PVC) or polyethylene (PE) and defines a confinement which is best seen in FIGS. 1 and 4, which serves for housing the bees (hive (2)). The nest box of the present invention is characterized in that it comprises a ventilation panel integrated in the area above the inner box (3) comprising the hive (2).

As used herein ventilation hole(s) of any shape, such as but not limited to a slit, round, oval or polygonal, may be used. Furthermore, a combination of two or more of the above shapes in a single ventilation hole may be used. As is evident from the examples hereinafter, one or more ventilation holes may be made. Although there are no particular restrictions to the number of ventilation holes used in the aforementioned ventilation panel, their size(s) should be such that they enable ventilation but at the same time prevent bumblebees from passing through. The latter could for example be achieved either by the dimension(s) of the ventilation hole(s) as such, or by the application of a dense mesh to cover said hole(s). It is furthermore, desirable to have the ventilation hole(s) as small as possible because excessive light could reduce bumblebees' activity.

The component panels of the nest box covering the area above the inner box (3) comprising the hive (2), and including the roof (lid) panel and the side panels, form the structural basis for the ventilation panel of the present invention. In the present invention, the ventilation hole(s) may be made on either of them. However, it is preferable to make them only on the side panels rather than the roof (lid) panel because the bumblebees should not be exposed to excessive light. The nest box is typically equipped with an entrance for the bumblebees to travel back and forth between the hive and outside. In order to prevent bumblebees from trying to enter the nest through the ventilation hole(s) by mistake, in a particular embodiment of the present invention, there are no ventilation hole(s) made on the face that corresponds with the face of the nest box where the entrance is fitted. Again based on the objective of the present invention to provide an economic and disposable nest box (1) for bumblebees, the ventilation panel as used herein is preferably made of the same disposable material as the nest box, such as, but not limited to cardboard.

The breeding of bumblebees requires supplying them with appropriate nutrients in the hive. For this reason, it is desirable that the roof (lid) panel of the nest box is structured as such, that the lid of the nest box can be opened. The latter is typically realized in that the lid of the nest box is attached in a hinged manner to the remaining of the nest box, alternatively in that the top of the nest box is a removable lid. Accordingly, in one aspect of the present invention, the ventilation panel could be designed independently of the roof (lid), as either a detachable or a integrated and deployable member that is fitted between the roof (lid of the nest box) and the top of the nest box.

In said embodiment of the present invention, the nest box does not need to be designed with a larger space above the hive, which helps to reduce the volume of the nest box when being carried. Also the detachable ventilation panel eliminates the necessity for a newly designed nest box as it may be arranged as an independent fixture to be fitted to any nest box of conventional structure.

As such, the ventilation panel may be sold either as an integrated part of a nest box or as an independent detachable member to be fitted to a conventional nest box. There are no particular requirements as to the size and shape of the ventilation panel, but in case the nest box comprises a lid that is attached in a hinged manner to the box, it is desirable to have the ventilation panel comprising a rectangular-shaped central panel with a tapered triangle-shaped end panel on each end (side members). In said embodiment wherein the ventilation panel is an integrated member of the nest box, the panel is further characterized in that it is a deployable ventilation panel that in open position extends the nest box above the inner box comprising the hive.

As will be apparent from the examples hereinafter, for the nest box as described herein, and in particular comprising a ventilation panel, wherein said ventilation panel consists of the side panels of the nest box covering the area above the inner box comprising the hive, more in particular consisting of a rectangular-shaped central panel with tapered, triangle-shaped end panels on both ends, even more in particular characterized in that the ventilation panel is a deployable ventilation panel that in open position extends the nest box above the inner box comprising the hive; it has now been found that this extension results in an enhanced ventilation of the hive;

without affecting the foraging activities of the bees, notwithstanding increased light in the nest box
with higher foraging activity at an increased ambient temperature;
with better development of the bumblebee hives at increased ambient temperature;
with faster removal of humidity from the hive, for example due to condensation water on the sugar water confinement at the base of the nest box;
with better control of brood temperature by the bees, enhancing the life span of the colony;

In particular the observation, that the nest activity and bumblebee behavior is not disturbed by the 'open' (in the sense of enabling light to enter into the inner box/hive) construction is remarkable given the general teaching in the art that but for the hive entrance/exit, light infiltration into the nest box should be minimized. The latter is also apparent when looking at earlier methods to try and enhance hive ventilation at higher ambient temperatures and/or humidity.

See for example;
The hood arrangement shown in FIGS. 2 and 3 of GB 869,884; where the presence of the boards (24) and the hood (14) together with the cloth (18) and the cover (16) prevent light entering the ventilated hive;
The hive cover shown in FIGS. 1 and 2 of AU 2008201117; where the castellated edge openings (26) are situated above and surround the closed upper surface (24). This taken together with the further lid (16) will again prevent light entering the ventilated hive;
The ventilated spacer for beehive shown in FIG. 3 of U.S. Pat. No. 3,927,431; where the meshed openings (13) are covered by an additional shield (16) to prevent direct sunlight entering the hive;
The electrical fan arrangement shown in FIG. 1 with again an overall closed arrangement of the fan (46) in the lid of the nest box.

In all of these examples, and in case further ventilation openings are present, they are only present in the vertical plane of the side panels of the nest box, thus minimizing the angle of incidence for sunlight. Such ventilation openings are never present on an inclined face, like in the present invention, enhancing the angle of incidence for sunlight.

The extension of the nest box above the inner box, using an inclined ventilation panel as with the present invention further results in better removal of the hot air when compared to the closed arrangements mentioned above. The inclined orientation, in particular the inward inclined orientation of the ventilation panel, significantly enhances the release of hot air through the ventilation openings. By opening the lid and inserting (deploying) the ventilation panel of the present invention, an additional air volume is added to and above the inner nest box, thus creating an additional air buffer for refreshment and ventilation in the inner box (hive), with not only a better removal of hot air but also an improved removal of toxic gases, such as for example $NH_3$, from the hive.

Consequently, the ventilated hive of the present invention, provides an economic and disposable nest box for bumblebees, etc. that provides sufficient and adaptable ventilation inside the nest box, in response to environmental conditions of temperature and humidity.

This invention will be better understood by reference to the Experimental Details that follow, but those skilled in the art will readily appreciate that these are only illustrative of the invention as described more fully in the claims that follow thereafter. Additionally, throughout this application, various publications are cited. The disclosure of these publications is hereby incorporated by reference into this application to describe more fully the state of the art to which this invention pertains.

EXAMPLES

The following examples illustrate the invention. Other embodiments will occur to the person skilled in the art in light of these examples. It is evident to the person skilled in the art that the technical scope of this invention should not be restricted by the modes explained herein and that the present invention may be carried out in various modes without changing any of its essentials.

Example 1

Ventilated Nest Box with the Ventilation Fitted on Top

Figure 2:
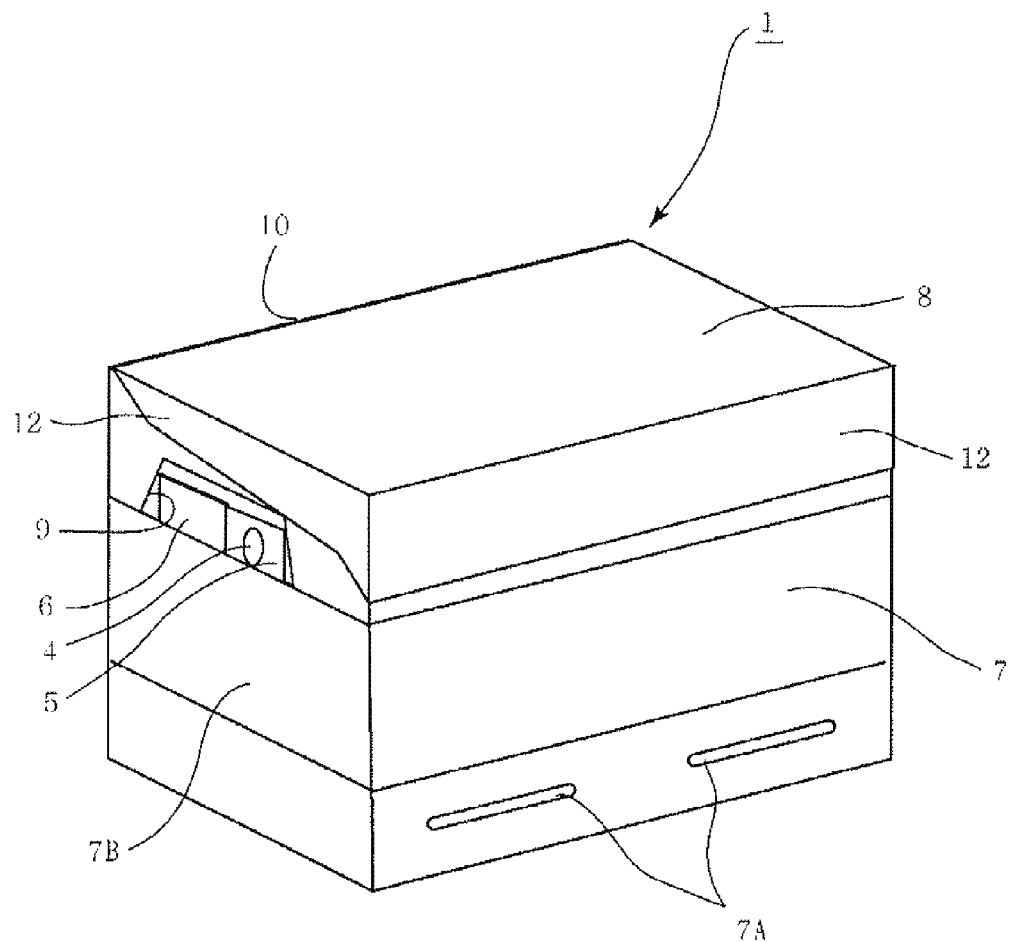
FIG. 2. A perspective view of a standard box.

Referring to the enclosed figures, a detailed description of a possible embodiment of the present invention is given below i.e. a nest box with the ventilation fitted on top.
Arrangement of Nest Box FIG. 1 shows a perspective view of a nest box (1) for bumblebees (hereinafter also referred to as "the nest box") and the hive (2) prior to their assembly. After their assembly, the inner box (3), with the hive (2) inside, fits in the nest box (1) as shown in FIG. 2, and the lid (8) can be closed. Although not shown here in detail, ventilation hole(s) are provided in the roof and/or side panel(s) of the inner box (3). The top of the inner box (3) may be opened so that the hive (2) can be placed or removed for example for cleaning purposes. Additionally, a door (4) can be provided in one of the panels of the inner box (3) for the bumblebees to travel back and forth between the hive (2) and the outside.

The entrance (4) consists of a first member (5) that opens the entrance (4) and a second member (6) that is mounted onto the first member (5) and slides against it. The entrance (4) opens or closes by sliding the second member (6) to the right or the left. The entrance (4) is closed when carrying the bumblebees, while it is normally open at the time of breeding.

The inner box (3) is designed to be slightly smaller than the inside dimensions of the nest box (1). A filling member, which can be made of Styrofoam or other suitable materials, can optionally be used to close the gap between the inner box and the nest box, due to the size difference (not shown in the drawing).

The nest box (1) has been made in two parts, the main body (7) below, and the lid (8) equipped with a roof panel covering the upper surface of the main body (7), together forming a hollow, rectangular parallelepipedum. However, other suitable shapes are also envisaged. The nest box (1) is made up of light material such as cardboard, or any other suitable material. Elongated ventilation holes (7A) are made on the side panel of the nest box (1), in the area near the long side at the bottom. In addition, in the nest box (1), an opening (9) has been made on a panel (7B), which is in the corresponding position to the door (4) of the inner box (3), in order to open the door (4).

Figure 3:
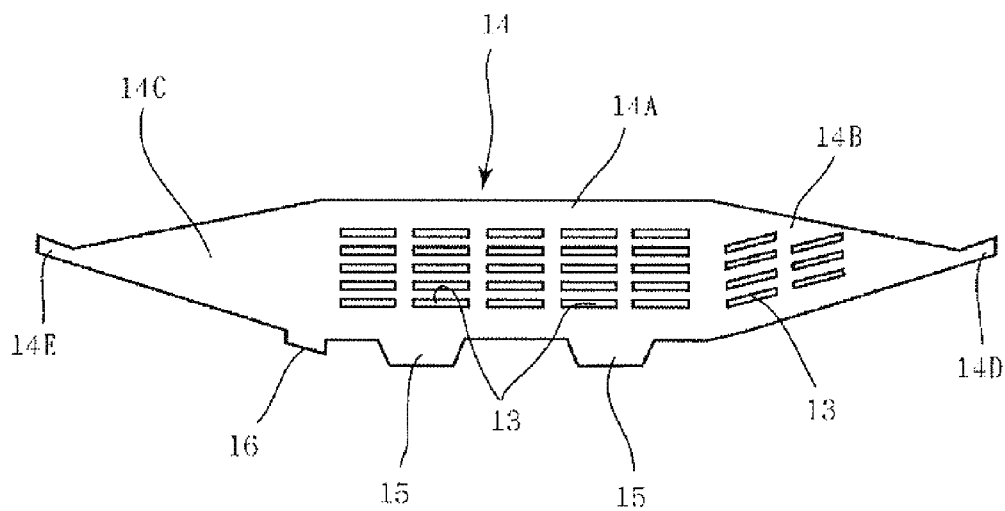
FIG. 3. A close-up view of a ventilating panel, according to the invention.

The lid (8) has been connected to the main body (7) on one of the long sides, which functions as a hinge (10) and thereby opens or closes the upper surface of the main body (7). In the lid (8), an engaging panel (12) has been mounted at an angle to the main body (7), alongside the three sides apart from the one with the hinge (10). In addition, in the nest box (1), a pair of elongated ventilation holes (11) is provided side by side in the upper area of the opposing side panel to the hinge (10). In said embodiment of the present invention wherein the ventilation panel is arranged as an independent member on top of the nest box, said ventilation holes (11) can be used as fitting holes to fix the ventilation panel on the nest box.
Arrangement of Ventilating Panel FIG. 3 shows a ventilation panel (14), according to the invention, with ventilation hole(s) (13). The ventilation panel (14) has been arranged as an independent member of the nest box (1) and can be fitted to the upper part of the nest box (1). The ventilation panel (14) consists of a central panel (14A) in a shape close to rectangular and two end panels (14B) and (14C) extending from both ends of the central panel (14A), towards the right and the left respectively. However, any other suitable shape for the ventilation panel is also envisaged.

The length of the central panel (14A) has been made to be about the same as that of the long side of the nest box (1) and has one or more ventilation holes (13). Both the end panels (14B) and (14C) have been made into a tapered triangle shape.

The lid (8) is fitted to cover the upper surface of the nest box (1) equipped with the ventilation panel (14) so that no gap is left between them, thereby avoiding bumblebees to pass through. The tapered ends of the end panels (14B) and (14C) are arranged as reinforcing parts (14D) and (14E) to add extra support to said parts by being corrugated. Regarding the end panels (14B) and (14C), the end panel (14C), which is to be positioned above the panel (7B), does not have any ventilation holes (13) while the other end panel (14B) has ventilation holes. The ventilation holes (13) have been made into a size (such as an elongated hole with a height of three to four millimetres approx.) that achieves inside ventilation of the inner box (3) while restricting the bumblebees' passage. Additionally, a pair of tabs (15), is provided on the lower end of the central panel (14A). The length of said tabs (15) being about the same, or slightly smaller as the length of the corresponding fitting holes (11) of the main body (7).

A joining piece (16) is mounted at the lower end of the end panel (14C), sticking out from the area near to the connecting part to the central panel (14A).
Fitting Ventilating Panel on the Nest Box As shown in FIG. 4, the reinforcing parts (14D) and (14E) of the ventilation panel (14) are folded inward and both of the end panels (14B) and (14C) are bent orthogonally against the central panel (14A).

Figure 5:
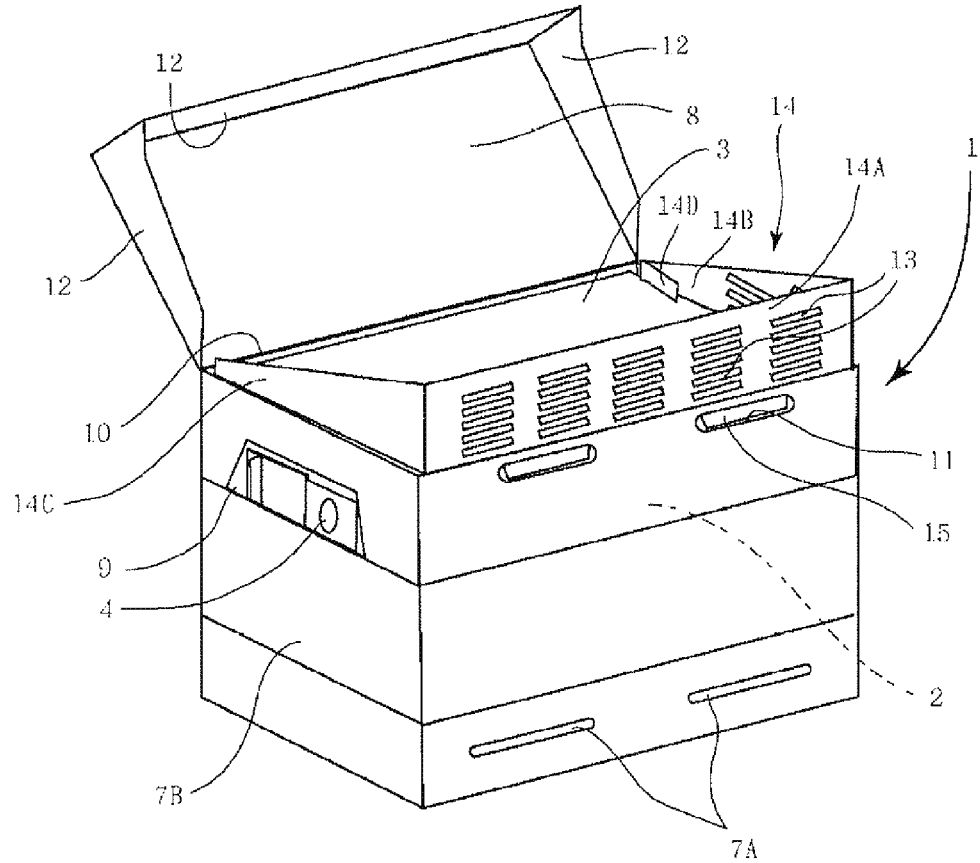
FIG. 5. A perspective view showing a ventilation panel fitted onto the top of the nest box, with the lid part open.

Next, the ventilation panel (14) is fitted over the upper surface of the nest box (1) with the lid (8) open. The ventilation panel (14) is at a prescribed position on the top of the nest box (1) (see FIG. 5) by fitting the pair of tabs (15) on the ventilation panel (14) to the pair of fitting holes (11) on the nest box (1) and then inserting the joining piece (16) between the nest box (1) and the inner box (3). The ventilation panel (14) can be removed from the nest box (1) with ease by reversing this operation.

Figure 6:
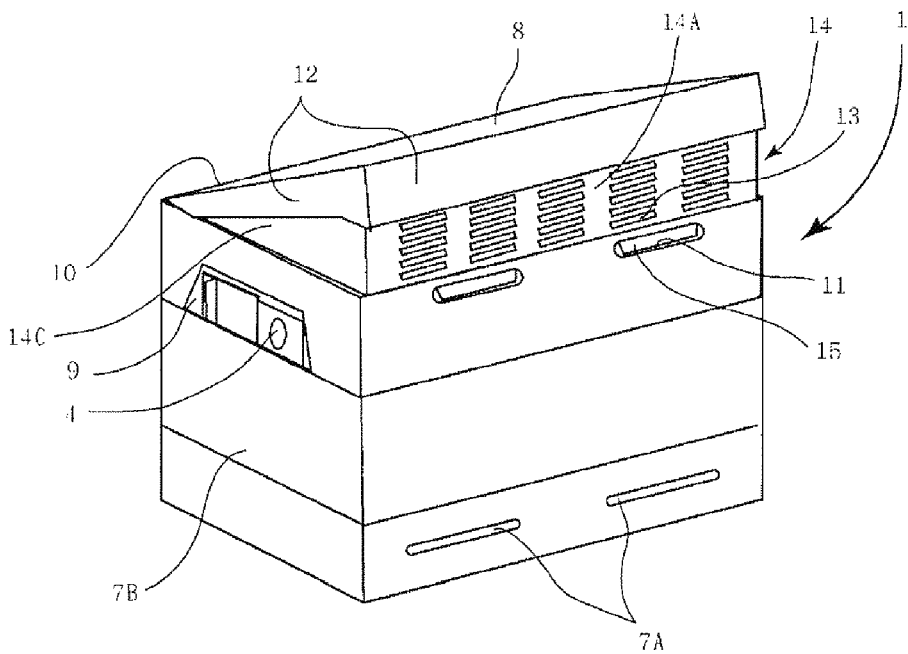
FIG. 6. A perspective view showing the ventilation panel fitted onto the top of the nest box with the lid part closed.

Finally, the lid (8) is mounted by being moved around on the hinge (10) until the engaging panel (12) overlaps the outside of the ventilation panel (14). Joining of the nest box (1) and the ventilation panel (14) is completed in this way, as shown in FIG. 6. The top of the nest box (1) can be opened easily by reversing the fitting operation described above.

When the ventilation panel (14) is mounted onto the nest box (1), the inside of the inner box (3) containing the hive (2) is sufficiently ventilated through the lower ventilation holes (7A) and upper ventilation holes (13), thereby creating a favorable environment for the bumblebees. In particular, when the inside temperature goes up, the ascending warm air can escape through the upper and lower ventilation holes (7A) and (13) thereby improving the air circulation inside the hive.

The ventilation holes (13) are made on the side panels (14A) and (14B) so that they do not disturb the activity of the bumblebees by letting in excessive light.

The ventilation holes (13) have not been made on the end panel (14 C), which is positioned above the panel (7B) equipped with the door (4), in order to avoid the situation where the bumblebees go inside the nest box (1) through the ventilation holes (13) by mistake.

Nutrients can be supplied into the hive (2) if the lid (8) of the nest box (1) is opened by a simple operation of moving it around on the hinge (10).

Furthermore, the ventilation panel (14) has been made as an independent member of the nest box (1) with the lid (8) that has a hinge structure. The nest box (1) and the lid (8) are almost in contact with each other when the ventilation panel (14) is not fitted, which means that the volume of the nest box (1) can be made smaller when carrying it around, by removing the ventilation panel (14).

The structure that allows the ventilation panel as an independent member to be mounted onto the conventional nest box (1) eliminates the necessity for a newly designed nest box (1). The ventilation panel (14) can be sold either as part of a nest box (1) or as an independent member that is usable with a conventional nest box (1).

The lid (8) is arranged to open/close the top of the nest box (1) by moving around upward/downward on the hinge (10), which facilitates positioning of the lid (8) at the time of fitting of the ventilation panel (14) thereby simplifying the fitting operation.

Test Verifying Effectiveness of Ventilated Nest Box

A test of pollen feeding has been carried out on the bumblebees using the nest box and the ventilation panel arranged as above. The nest box used in the test is a Tokai Bussan product, from Hanyton, for Japanese-native bumblebees. The trial conducted on said nest box was carried out on a tomato farm in the area near Ama-county in Mie (Japan), to compare the breeding conditions of bumblebees, with or without the ventilating panel.

An automated recording instrument of temperature and humidity has been placed inside the nest box in order to record the temperature and humidity every hour. The instrument is a product of KN Laboratories, Inc. called "Hygleklon", an ultra-small temperature/humidity data logger in a button battery shape. The recording period was for ten days from 14 to 25 Dec. 2009. Results obtained are shown in Table 1.

TABLE 1

Results of field test with ventilated nest box

| | Temperature (° C.) | | Humidity (RH %) | |
|---|---|---|---|---|
| | With Ventilating Panel | Without Ventilating Panel | With Ventilating Panel | Without Ventilating Panel |
| Average | 17.2 | 17.1 | 77.2 | 87.0 |
| Maximum | 27.7 | 27.2 | 87.9 | 95.0 |
| Minimum | 13.7 | 14.2 | 58.9 | 70.5 |
| St. Dev. | 2.79 | 3.23 | 4.50 | 3.94 |

The breeding conditions have been compared by determining ratios of bite-marks left on the tomato flowers. No difference has been observed for this parameter between the two cases, with and without the ventilating panel, both of which maintained approximately the same condition of 100%.

The temperature was 17.1±3.23° C. when the ventilation panel was not used while it was 17.2±2.79° C. when the panel was used, showing no significant difference between the two cases. On the other hand, the humidity was 87.0±3.94% RH when the ventilation panel was not used while it was 77.2±4.50% RH when the panel was used. Therefore, a significant decrease in humidity of as much as 10% inside the nest box was observed when the ventilation panel was used.

In this way, according to the modes for carrying out this invention, a nest box for bumblebees has been delivered which enables sufficient ventilation, keeping humidity inside the nest box at reasonable levels.

Modification Examples

This invention can also be carried out in the modes other than the nest box (1) explained above, by making the modifications as follows:
1. The ventilation holes (13) can take shapes other than the long shape, such as round, oval or polygonal shapes.
2. The lid (8), which is connected to the main body (7) at the hinge (10), can be arranged as an independent part from the main body. In this case, the ventilation panel can be made into a rectangular shape covering all the four sides of the top of the main body. Again, the ventilation holes are in particular to be made on the three panels except the one equipped with the entrance. This arrangement serves as an example where further improvement in ventilation may be achieved with more ventilation holes added.

Example 2

Ventilated Nest Box with an Integrated Ventilation Panel

Referring to the enclosed figures, a detailed description of a possible embodiment of the present invention is given below i.e. a nest box with an integrated ventilation panel.

Arrangement of Nest Box

Figure 16:
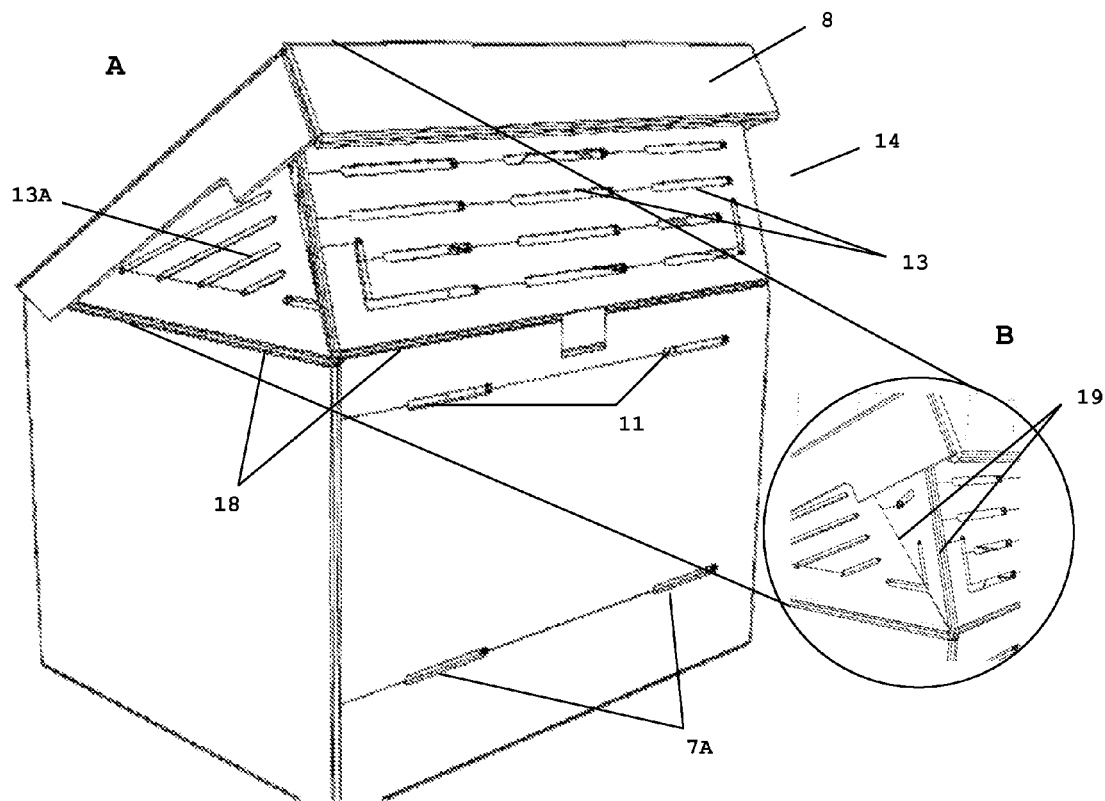

FIG. 16 shows a ventilated nest bow with an integrated ventilation panel. Similar to the detachable ventilation panel, the integrated ventilation panel (14) comprises ventilation holes (13) on the front panel that in combination with the lower ventilation holes (7A) assure a proper air circulation inside the hive. Again, similarly to the detachable ventilation panel, further ventilation holes (13A) are present on the side panel (14A) but not on the side panel (14C), which is positioned above the panel (7B) equipped with the door (4) (not shown in FIG. 16), in order to avoid the situation where the bumblebees try to go inside the nest box through the ventilation holes (13) by mistake.

Different from the detachable ventilation panel, the integrated panel is hingedly connected to the nest box through pliable foldings (18) on the top edges of the front and side panels of the nest box. A further pliable fold (19) in the side panels of the ventilation panel allows that the ventilation panel is folded inside, for example to reduce the volume of the nest box during transport, or in case the ambient temperature is lower and enhanced ventilation of the nest box is not desired. Again, and similar for the detachable ventilation panel, the lid (8) has been connected to the main body (7) on one of the long sides, which functions as a hinge (10) and thereby opens or closes the upper surface of the main body (7).

Test Verifying Effectiveness of Ventilated Nest Box
A: Greenhouse Experiment 1
Materials & Methods
Hives & Plots For this experiment, 3 replicates with each a plot size of 1 of the following hives, were used:
 1 Biobest hive with standard cardboard covers, containing *Bombus terrestris*
 1 Biobest hive with cardboard cover with additional ventilation strips, containing *Bombus terrestris*

The plots were placed crosswise in the greenhouse to obtain a good spread.

Preparation of the Hives and Food Supply

When hives were prepared for the trial, extra pollen balls were put in the hives for the bumblebees to buildup the brood and wool was added as insulation. Sugar water as a food source was available underneath all hives. Part A of this trial was done with empty bumblebee hives. Part B contains hives with *Bombus terrestris*.

Selection of the Hives

In every standard hive a data logger was placed on the brood, and covered with wool, to measure the temperature and humidity during the experiment.

Methodology

The trial was carried out in a greenhouse at Biobest Belgium NV. The greenhouse was set to a temperature of 25+/−5° C. A data logger was placed in the middle of the greenhouse to measure temperature and humidity. The loggers in the hives kept recording data from inside the brood. This experiment was done first with empty hives to exclude the bumblebee parameter. Afterwards the experiment was repeated in hives with bumblebees to evaluate the brood temperature in hives with a standard or a ventilated cover.

Assessments

After a few days, the data (temperature and relative humidity) were studied and a comparison between the standard and ventilated cover was made.

Data Analysis

Comparison of the different objects was based on the brood temperature of the different objects.

Results & Discussion

Figure 7:
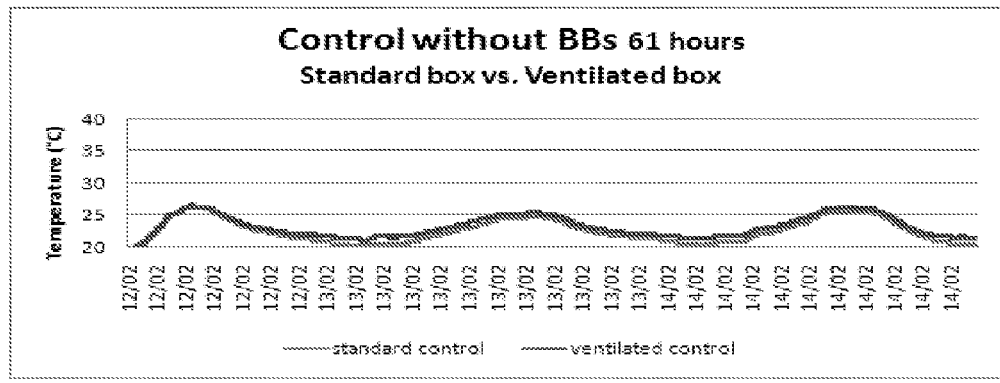
FIG. 7. Brood temperature over the period 12 Feb. 2010-14 Feb. 2010 for empty standard and ventilated nest boxes, under standard conditions FIG. 8. Brood temperature over the period 12 Feb. 2010-14 Feb. 2010 for empty standard and ventilated nest boxes, under heated conditions FIG. 9. Brood temperature over the period 17 Feb. 2010-19 Feb. 2010 for standard and ventilated nest boxes, containing bumblebees, under standard conditions FIG. 10. Brood temperature over the period 17 Feb. 2010-19 Feb. 2010 for standard and ventilated nest boxes, containing bumblebees, under heated conditions FIG. 11. Mean flight activity (3 hives per measurement) for standard and ventilated nest boxes under standard (A) and heated (B) conditions FIG. 12. Brood temperature over the period 9 Mar. 2010-19 Mar. 2010 for standard and ventilated nest boxes under standard (A) and heated (B) conditions FIG. 13. Mortality in standard and ventilated nest boxes under standard and heated conditions (3 hives per measurement). A: Average number of living and dead workers; B: Average number of Dead Larvae, Living Drones and Pupae FIG. 14. Brood temperature over the period 1 Apr. 2010-27 Apr. 2010 for standard and ventilated nest boxes under standard (A) and heated (B) conditions FIG. 15. Mortality in standard and ventilated nest boxes under standard and heated conditions (3 hives per measurement). A: Average number of living and dead workers; B: Average number of Dead Larvae, Living Drones and Pupae FIG. 16. A A perspective view showing a ventilated nest box with an integrated ventilation panel fitted onto the top of the nest box. B Detail view of the pliable folding (19) in the integrated ventilation panel.
Figure 8:
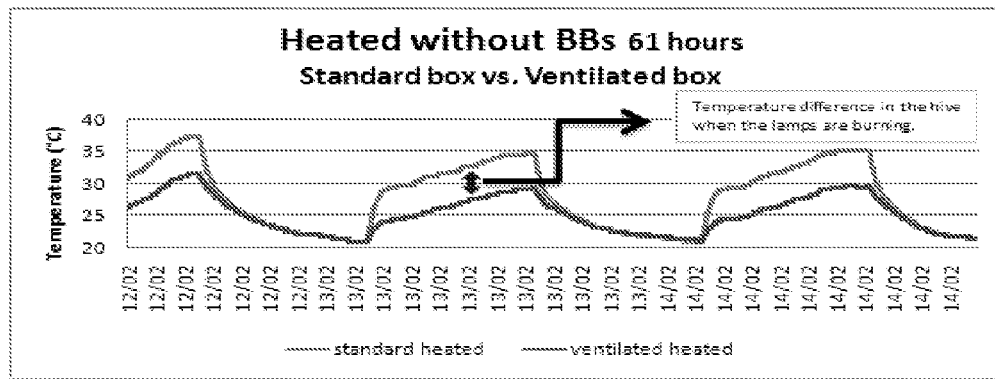

A. Temperature Effect in Hives without Bumblebees (FIG. 7+8)

The temperature in the greenhouse was set to 28° C. during the day and 22° C. during the night. At night, the temperature inside both boxes dropped to 20.95° C. So, there is no difference between both objects. A temperature difference is noticeable during the day when the plant grow lamps are burning. The standard box has a mean higher temperature of 5.13° C. compared with the ventilation box. Mean temperatures of the boxes are 32.11° C. for the standard box and 26.98° C. for the ventilated box. We can conclude that more heat can be removed out of a ventilated box because of the additional ventilation strips.

Figure 9:
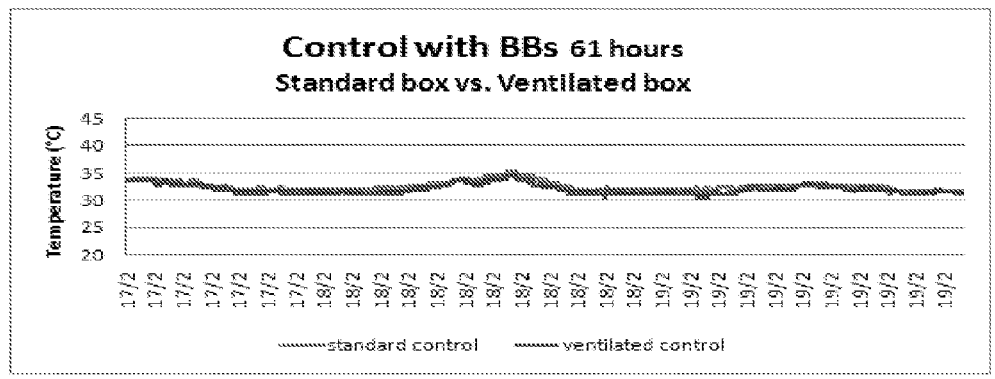
Figure 10:
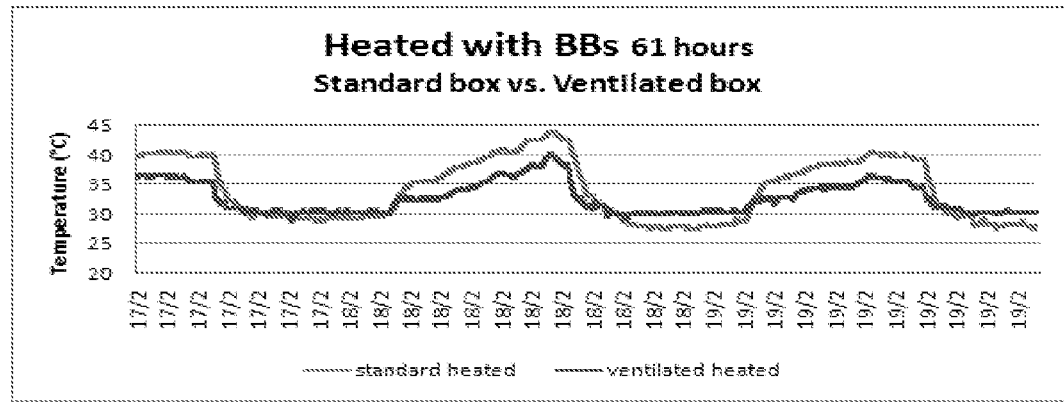

B. Temperature Effect in Hives with Bumblebees (FIG. 9+10)

The temperature in the greenhouse was set to 28° C. during the day and 22° C. during the night. In the standard box, a mean temperature during the day was measured that was 3.54° C. higher than the mean temperature of the ventilated box. (respectively 38.48° C. and 34.94° C.)

B: Greenhouse Experiment 2

Materials & Methods

Hives & Plots

For this experiment, 3 replicates with each a plot size of 1 of the following hives, were used:
 3 identical Biobest hives with standard cardboard covers, containing *Bombus terrestris*
 3 identical Biobest hives with cardboard cover with additional ventilation strips, containing *Bombus terrestris*

The plots were placed crosswise in the greenhouse to obtain a good spread.

Preparation of the Hives and Food Supply

When hives were prepared for the trial, the pollen balls were taken out of the brood and wool was added as insulation. Sugar water as a food source was available underneath all hives. During the trial, fresh non-treated pollen was available in the middle of the greenhouse ad libitum. This is necessary for the bumblebees to build up the brood.

Selection of the Hives

Before the start of the trial, 9 standard hives were started up. In each hive a data logger was placed on the brood, and covered with wool, to measure the temperature and humidity during the hive development. These hives were monitored on IN and OUT flight activity at least 3 times during the following week for 30 minutes per hive. For each counting day, the assessment was performed at the same time whereby the weather conditions were recorded. After one week, 6 equally flying hives were selected and used for the main trial. 3 of these hives were reserved for the standard replicates, the 3 other hives for the test with the cardboard cover with additional ventilations strips.

Methodology

The trial was carried out in a greenhouse at Biobest Belgium NV. The greenhouse was set to a temperature of 25+/−5° C. and additional light was given if needed. Just as for experiment 1, a data logger was placed in the middle of the greenhouse to measure temperature and humidity. The loggers in the hives kept recording data from inside the brood. For the object of standard covers, yellow covers were used. The covers with additional ventilation strips were white. The hives were placed in U-shape whereby all exit holes were positioned towards the non-treated pollen source in the center of the greenhouse. The selected hives were placed in the greenhouse the evening before the trial was started. Plant grow lamps were attached 15 cm above the hives to raise the temperature of the brood to represent high radiation heat conditions. The next morning (=day 0), the hives were opened and monitoring on flight activity started. At the end of the trial (6 to 8 weeks), an observation of the hive development was carried out by counting the numbers of workers and drones.

Afterwards, we did the trial again but with a few adjustments. The methodology was the same as explained in the experiment above with the exception that the standard covers here were white, just as the covers with additional ventilation strips. This is necessary to avoid preferences of the bumblebees towards different colors.

We also positioned all the hives towards the southeast to profit the sunrise in the morning. This way a better flight activity was possible because bumblebees like to fly in the morning.

An additional lid was attached on to the cover above the strips to prevent too much light entering the hives through the ventilation holes.

Assessments

The first assessment was performed 1 hour after startup (morning assessment). The second and third assessment was carried out, respectively 4 hours (midday) and 7 hours (evening) after startup. The IN and OUT flight activity was monitored carefully for 30 minutes per hive.

The method of morning-midday-evening monitoring was used until the hives reached a high flight efficacy. From then on, 1 scoring a day was sufficient (at 11.00 am). Weather conditions at that time were recorded carefully.

The mean longevity of a standard bumblebee hive should be 6 to 8 weeks. The start of drone production was an indication that the hive was going to collapse. The additional ventilation strips could have a positive or negative impact on the longevity of a bumblebee hive. So, the hives were observed until drone production was noticeable or until the flight activity stopped. At this point, the trial was ended and an evaluation of the hive development was performed. An assessment on each hive was carried out towards living drones, living workers, dead workers and pupae.

Data Analysis

Figure 11A:
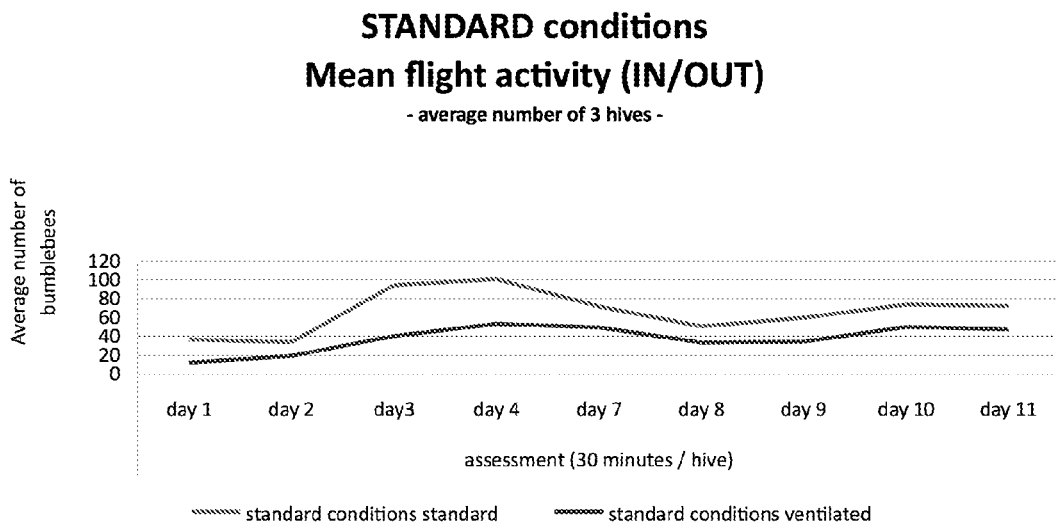
Figure 11B:
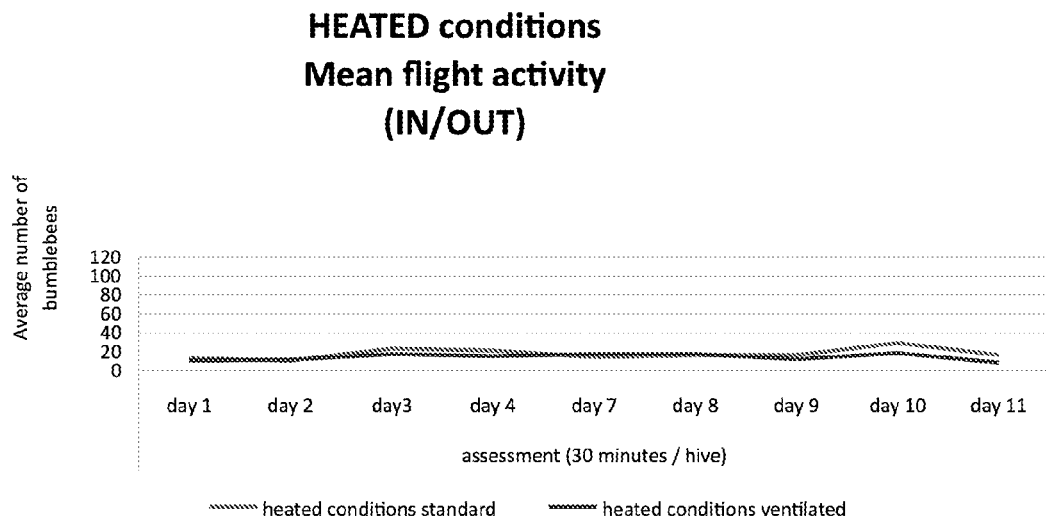

A report with detailed data on a "per hive/per object" basis was provided. Comparison of the different objects was based on:
  Increasing flight efficacy after startup
  Flight activity in time (6 to 8 weeks)
  Longevity of hives Results & Discussion A. Flight Activity, Brood Temperature and Observation of the Hives (FIG. 11+12+13)

In standard non-heated conditions, the mean flight activity for the standard box was 590.3 during the whole trial. For the ventilated box the mean activity was 337.0 flying bumblebees. This is with a mean of 65.6 per assessment for the standard and 37.4 for the ventilated box. The mean activities under heated conditions were almost the same for the standard box and ventilated box but are much lower compared with non-heated conditions. This is respectively 157.7 and 124.7 with a mean of 17.5 and 13.9 for each counting. The graphs can be found in FIG. 11.

Figure 12A:
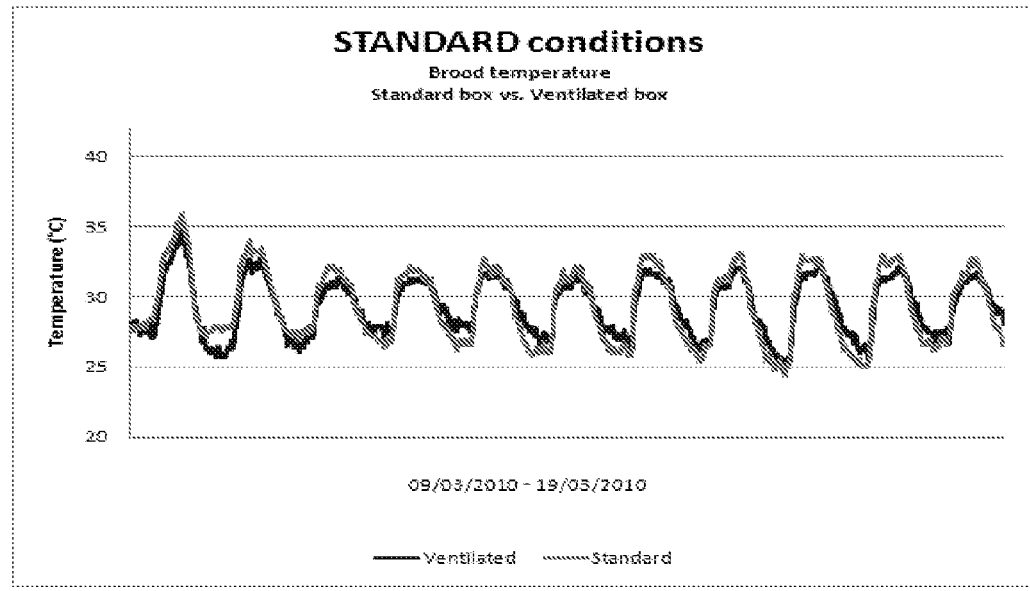
Figure 12B:
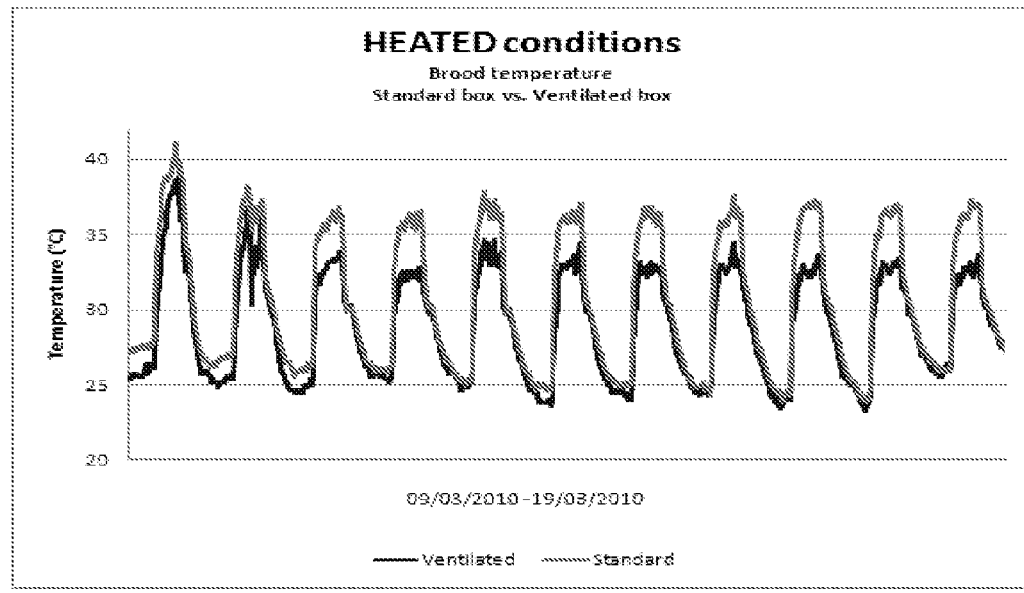

The brood temperature in standard non-heated conditions is equal for the ventilated box and the standard box (respectively 29.31° C. and 29.38° C.). However, there is a big difference in brood temperature of both objects during the day in heated conditions. The mean maximum brood temperature of hives with the standard box is 37.58° C. For those with the ventilated box it is clearly lower i.e. 34.49° C. This is a mean difference of 3.09° C. which is a lot for insect larvae. (FIG. 12)

Figure 13A:
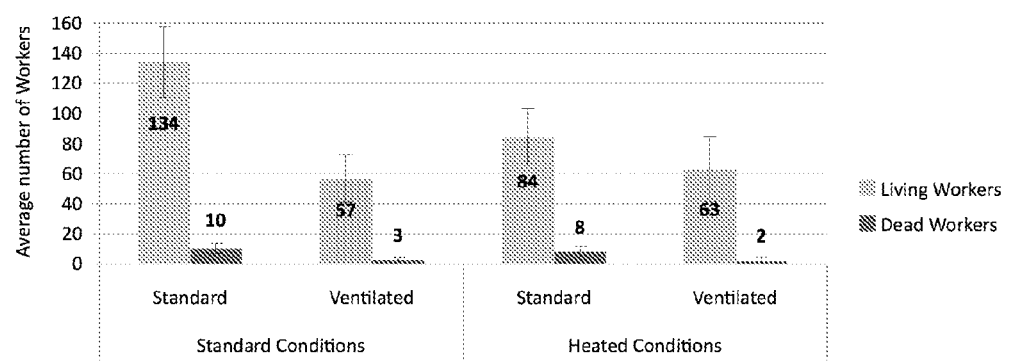
Figure 13B:
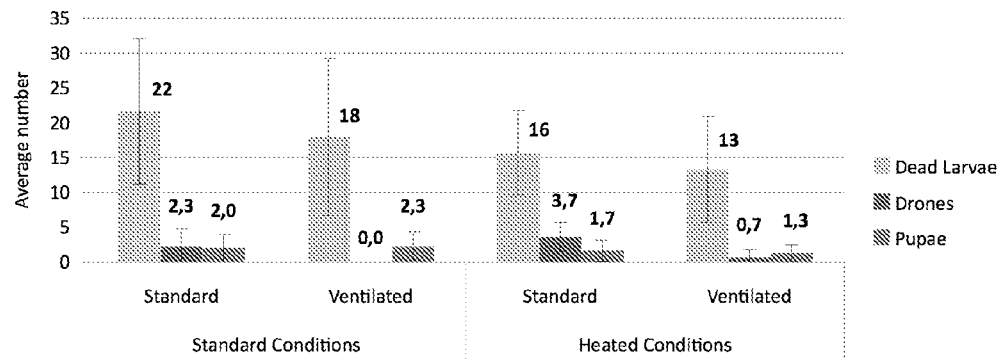

After 11 days there were already drones noticeable in the greenhouse so the trial was stopped and an evaluation of the hives was made (FIG. 13). Although there was no big difference in mortality of workers between the different objects, ventilated nest boxes in standard as well as heated conditions showed a slightly reduced mortality of the workers. Furthermore, we found that there were more living workers present in the standard hives compared to heated hives, especially in standard non-heated conditions. This may indicate that workers find the standard yellow boxes more attractive and change hives, maybe because of the color of the hives or because of the light inside the hive (more light in hives with additional ventilation). Therefore, a new trial was set up and a few changes were made. (positioning of the hives, color of the hives and an additional lid above the ventilation strips)

Figure 14A:
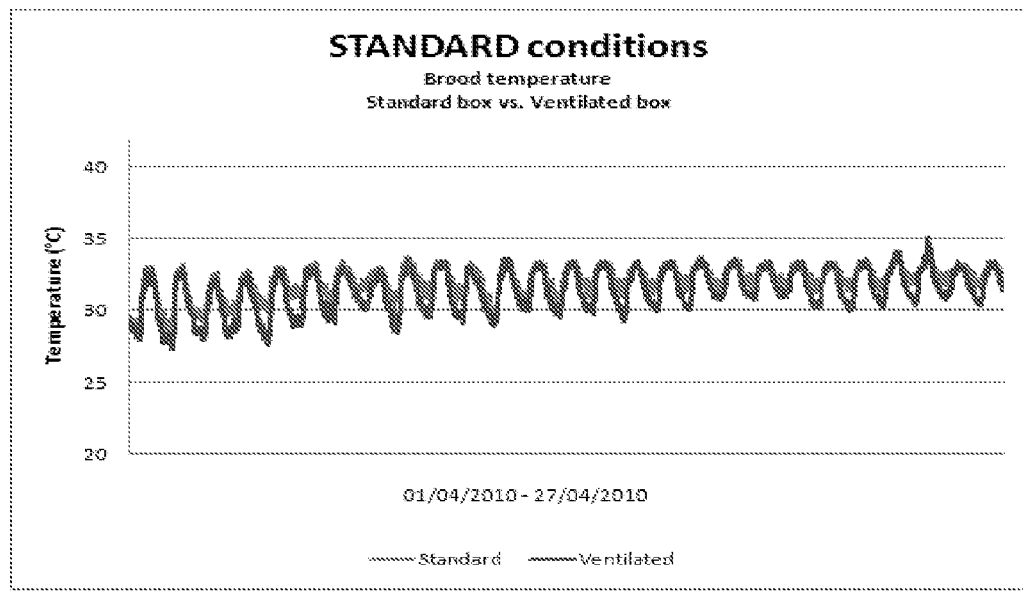
Figure 14B:
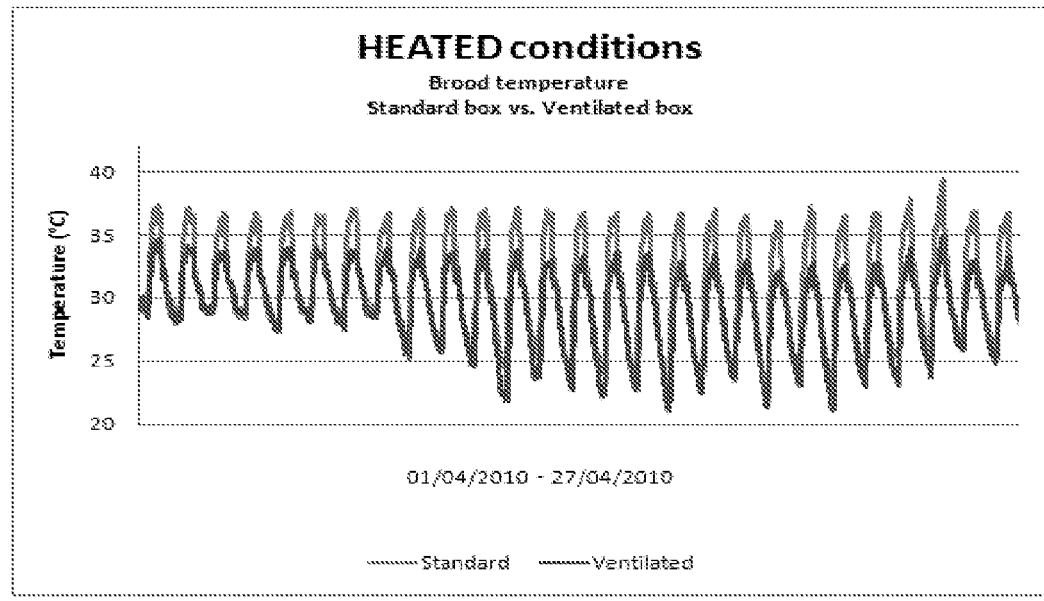

B. Flight Activity, Brood Temperature and Observation of the Hives (FIG. 14+15)

The mean brood temperature in standard non-heated condition is almost the same for the ventilated box and the standard box (resp. 31.41° C.-32.09° C.). In heated conditions, the mean maximum brood temperature of the ventilated box is 33.51° C. The mean maximum brood temperature of the standard hive, however, is again much higher i.e. 36.98° C. which gives us a mean difference of 3.47° C. This confirms the results of Trial 1 where the mean difference was 3.09° C. (FIG. 14).

Figure 15A:
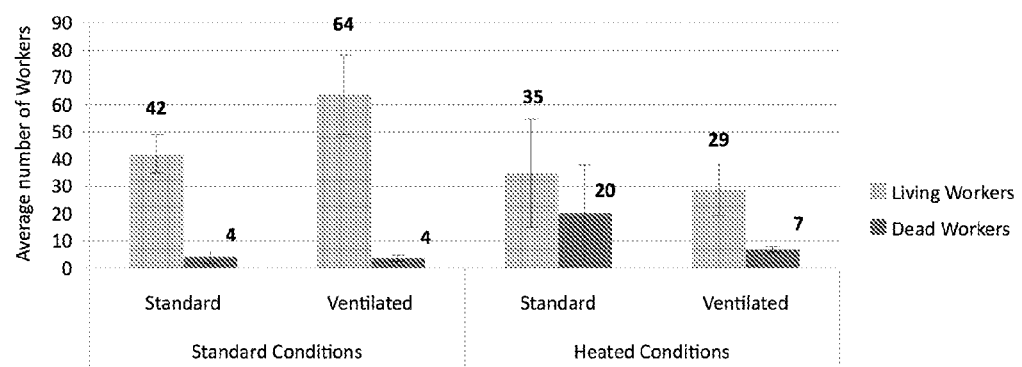
Figure 15B:
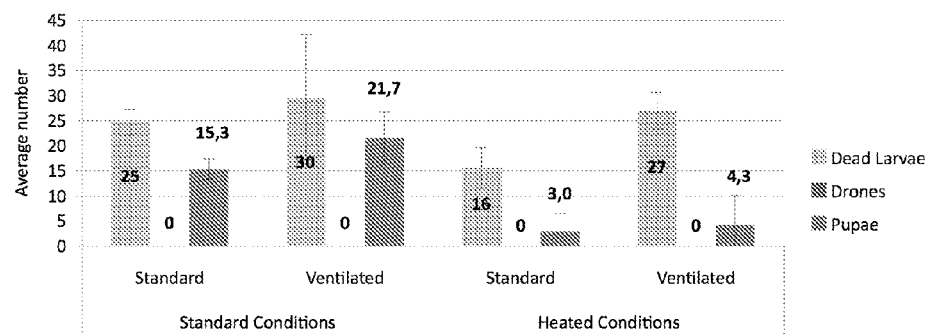

After 27 days, the flight activity under heated conditions dropped to a minimum. At this point we decided to stop the trial and an observation of the hives was performed (FIG. 15). The mean mortality under standard conditions is 10.32% for the standard hives and 5.76% for the ventilated hives. We noticed that there was a much higher worker mortality in the hives under heated conditions. For standard hives and ventilated hives this was respectively 58.10% and 24.14%. Out of these results we can conclude that the bumblebees in the hives under heated conditions had to work a lot harder to cool down the brood compared to those under standard non-heated conditions. Probably this is why their lifespan is shorter and the mean total mortality per hive is higher. However, more importantly under these extreme conditions, the benefit of using ventilated nest boxes is very clear, resulting in a highly reduced mortality of workers compared to the non-ventilated nest boxes.

In literature studies we found that at temperatures above 32° C., the foraging activity reduces. From 35° C., bumblebees prefer to cool down the brood instead of foraging and at this point they also stop feeding larvae. Foraging in these conditions will only occur in the early morning or late afternoon. (James & Pitts-Singer, 2008) Because of these hard conditions and extra fanning activity, the life span of the colony will reduce. Bumblebees become inactive at temperatures above 40° C. to prevent that their own bodies overheat. (James & Pitts-Singer, 2008)

The invention claimed is:

1. An assembly comprising a nest box for bumblebees with their hive inside comprising a roof panel, and a deployable ventilation panel in an area above an inner box comprising the hive, said deployable ventilation panel having one or more ventilation holes in sizes that enable ventilation but at the same time prevent bumblebees from passing through, wherein the ventilation panel in a deployed position provides ventilation to the hive; and wherein the ventilation panel further comprises one or more pliable folds to enable the ventilation panel to be folded inside.

2. The assembly according to claim 1, wherein there are no ventilation holes in the roof panel of said nest box.

3. The assembly according to claim 1, wherein there are no ventilation holes made on the face of the ventilation panel that corresponds with a face of the nest box where an entrance is fitted.

4. The assembly according to claim 1, wherein the roof panel of said nest box is attached in a hinged manner to the nest box.

5. The assembly according to claim 1, wherein the ventilation panel consists of a rectangular-shaped central panel with tapered, triangle-shaped end panels on opposite side ends.

6. The assembly according to claim 1, wherein the ventilation panel is an integrated, non-detachable member on top of the nest box.

7. The assembly according to claim 6, wherein the ventilation panel in a deployed position extends the nest box above the inner box comprising the hive.

8. An assembly comprising a nest box for bumblebees with their hive inside comprising a roof panel, and a deployable ventilation panel in an area above an inner box comprising the hive, said deployable ventilation panel having one or more ventilation holes in sizes that enable ventilation but at the same time prevent bumblebees from passing through, wherein the roof panel of said nest box is attached in a hinged manner to the nest box; and wherein the ventilation panel further comprises one or more pliable folds to enable the ventilation panel to be folded inside.

9. The assembly according to claim 8, wherein there are no ventilation holes in the roof panel of said nest box.

10. The assembly according to claim 8, wherein there are no ventilation holes made on the face of the ventilation panel that corresponds with a face of the nest box where an entrance is fitted.

11. The assembly according to claim 8, wherein the ventilation panel consists of a rectangular-shaped central panel with tapered, triangle-shaped end panels on opposite side ends.

12. The assembly according to claim 8, wherein the ventilation panel is an integrated, non-detachable member on top of the nest box.

13. The assembly according to claim 12, wherein the ventilation panel in a deployed position extends the nest box above the inner box comprising the hive.

14. An assembly comprising a nest box for bumblebees with their hive inside comprising a roof panel, and a deployable ventilation panel in an area above an inner box comprising the hive, said deployable ventilation panel having one or more ventilation holes in sizes that enable ventilation but at the same time prevent bumblebees from passing through, and wherein warm air from the hive can rise and leave the nest box through the ventilation holes; wherein the ventilation panel further comprises one or more pliable folds to enable the ventilation panel to be folded inside.

15. An assembly comprising a nest box for bumblebees with their hive inside comprising a roof panel, and a deployable ventilation panel in an area above an inner box comprising the hive, said deployable ventilation panel having one or more ventilation holes in sizes that enable ventilation but at the same time prevent bumblebees from passing through, wherein the ventilation panel in a deployed position provides ventilation to the hive, and wherein the ventilation panel consists of a rectangular-shaped central panel with tapered, triangle-shaped end panels on opposite side ends.

* * * * *